United States Patent Office 3,597,441
Patented Aug. 3, 1971

3,597,441
CYANETHYLATION OF 5,5-DIMETHYL-HYDANTOIN
Johannes Wollner, Kapellen, Kreis Moers, and Hans-Albrecht Meyer-Stoll, Neukirchen-Vluyn, Germany, assignors to Rheinpreussen Aktiengesellschaft fur Bergbau und Chemie, Homberg (Lower Rhine), Germany
No Drawing. Filed Feb. 12, 1968, Ser. No. 704,548
Claims priority, application Germany, Feb. 14, 1967,
R 45,274
Int. Cl. C07d 49/32
U.S. Cl. 260—309.5                                     6 Claims

ABSTRACT OF THE DISCLOSURE

3 - cyanethyl - 5,5 - dimethylhydantoin or 1,3-dicyanethyl - 5,5 - dimethylhyantoin are produced by reacting 5,5 - dimethylhydantoin and acrylonitrile in an aqueous medium at about 50–150° C. and a pH of about 7–9.5. The compounds produced are useful as intermediates in the pharmaceutical and polymer arts.

---

The invention relates to a process for the manufacture of 3 - cyanethyl - 5,5 - dimethylhyantoin and of 1,3-dicyanethyl - 5,5-dimethylhydantoin by the cyanethylation of 5,5-dimethylhydantoin in aqueous solution.

It is know that acrylonitrile can be added onto NH compounds. One of the many possibilities of doing this, which have hitherto been described, involves the virtually complete reaction of acrylonitrile with ammonia or aliphatic bases, often in the cold, in an aqueous or even alcoholic medium.

According to "Organic Reactions V" (Wiley, 1949, page 87), the use of water as a solvent is possible only in the case of the cyanethylation of NH compounds having a definitely strong basic reaction, such as hydrazine, ammonia and primary amines.

It is in the state of the art that secondary aliphatic amines as well as nitrous heterocyclic compounds such as pyridine, piperazine, morpholine or ethylene imine can be easily cyanethylated with acrylonitrile.

It is known from German Pat. 598,185 that nitrous heterocyclic compounds having NH groups of an acid character will often form addition compounds with acrylonitrile only in the presence of acid catalysts, and with substantially more difficulty than aliphatic amines or nitrous heterocyclic compounds having basically reacting NH groups. It has become known from the work of O. Bayer in "Angewandte Chemie" 61, 235 (1949), that acrylonitrile can be added onto carbazole most easily in a pyridine solution, in the presence of alkali.

The addition of acrylonitrile onto alcohols:

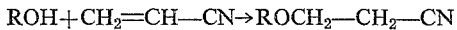

in the presence of sodium, sodium hydroxide or quaternary basis, is in the prior art.

From German Pat. No. 731,708 it has become known that acrylonitrile can be reacted with water at 20 to 80° under the influence of catalytic amounts of alkali hydroxides or alkaline earth hydroxides to form β,β'-dicyanodiethyl ethers:

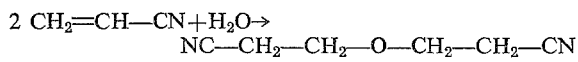

This ether very easily occurs undesirably in the attempt to add acrylonitrile on in an aqueous alkaline medium when the intended addition runs into difficulties—of a steric nature for example.

It is known from French Pat. 877,120 that acid imides, such as succinimide, can easily be transformed by the adding on of acrylonitrile to β-cyanethyl succinimide in anhydrous solvents.

It has become known from J. Amer. Chem. Soc. 67, 199 (1945) that acrylonitrile can easily be added onto isatine at ordinary temperature, in an alcoholic solution, using a quaternary ammonium base as a catalyst.

Contrary to the prejudices indicated in the state of the art cited hitherto, namely:

(a) When water is used as solvent at temperatures between 20 and 80°, in the attempt to add acrylonitrile onto a poorly reactive compound like 5,5-dimethylhydantoin, the formation of β,β-dicyanodiethyl ethers occurs in an alkaline medium extremely easily, and (b) that nitrous heterocyclic compounds having NH groups of an acid character often form addition compounds with acrylonitrile only in the presence of acid catalysts, and with substantially greater difficulty than aliphatic amines or nitrous heterocyclic compounds having basically reacting NH groups, or that the use of extremely expensive solvents such as pyridine and dioxane along with special expensive catalysts, such as the potassium salt of carbazole, is necessary, it can be shown surprisingly that the invention makes possible a process for the manufacture of 3-cyanethyl-5,5 - dimethylhydantoin and of 1,3-dicyanethyl-5,5-dimethylhydantoin, starting out from 5,5-dimethylhydantoin, this process being characterized in that 5,5 - dimethylhydantoin is reacted with acrylonitrile in aqueous solution, at pH values of 7 to 9.5 and at temperatures between 50 and 150° C. This process may further be characterized in that the aqueous solution is maintained during the entire contacting time at pH values between about 7.5 and 8.5.

The compounds thus manufactured can be used as intermediates in the pharmaceutical industry and in the manufacture of polymers.

EXAMPLE 1

Preparation of 3-cyanethyl-5,5-dimethylhydantoin 1 mole of 5,5-dimethylhydantoin (128 g.) is dissolved in 200 ml. of water and the solution is adjusted to a pH of 8 by the addition of caustic soda solution.

The solution is placed in a vessel equipped with a stirring apparatus and a reflux condenser, and ½ mole (27 g.) of acrylonitrile is added to it with stirring and heating to 78° C.

After about 45 minutes the boiling point of the solution has risen to almost 100°; the solution is cooled to 70–75° C. and another half mole (27 g.) of acrylonitrile is added.

After about 40 to 50 minutes the reaction has ended and the reflux temperature has risen to 100°.

After the mixture has cooled to room temperature a clear raw product crystallizes out, which, after recrystallization from water, has a melting point of 96-98°. Yield of 3-cyanethyl-5,5-dimethylhydantoin: 143 g., i.e., 79% of the theory, in the form of colorless crystals.

Theoretical (percent): C, 53.1; H, 6.06; N, 23.2. Found (percent): C, 52.9; H, 5.7; N, 23.1.

Molecular weight: Theory: 181.2. Found: 187.

EXAMPLE 2

Preparation of 1,3-dicyanethyl-5,5-dimethylhydantoin 1 mole (128 g.) of 5,5-dimethylhydantoin is dissolved in 200 g. of water and the aqueous solution is adjusted by the addition of soda lye to a pH of 8. The solution is placed in a vessel equipped with a stirrer and a reflex condenser, and 1 mole (53 g.) of acrylonitrile is added, with stirring and heating at 78° C. Then the solution is heated to the refluxing temperature.

After the boiling temperature is reached the solution is cooled to 78° C. and another mole (53 g.) of acrylonitrile is added.

The solution is then heated again until the boiling temperature of the water is reached.

After cooling to room temperature, a clear raw product crystallizes out. After recrystallization from water colorless crystals are obtained which dissolve easily in acetic acid and in methanol, but with difficulty in ethers or isopropanol.

The yield amounts to 193 g., i.e., 82% of the theory.

*Analysis data.*—Theoretical (percent): C, 56.4; H, 6.0; N, 23.9. Found (percent): C, 56.4; H, 5.8; N, 24.3.

Molecular weight: Theory: 234. Found: 238.

As indicated in the examples the reactants can best be used in corresponding molar quantities, i.e. either one mole or two moles acrylonitrile per mole of the 5,5-dimethylhydantoin, depending on whether the 3-cyanethyl or the 1,3-dicyanethyl, respectively, is to be produced. The pressure can be and preferably is atmospheric.

What is claimed is:

1. In a process for manufacture of 3-cyanethyl-5,5-dimethylhydantoin or 1,3-dicyanethyl-5,5-dimethylhydantoin, wherein 5,5-dimethylhydantoin is reacted with acrylonitrile at an elevated temperature to produce said 3-cyanethyl or 1,3-dicyanethyl compound, the improvement which comprises carrying out said reaction in an aqueous reaction medium having a pH of about 7 to 9.5, at a temperature of between about 50 and 150° C.

2. Process according to claim 1, wherein 5,5-dimethylhydantoin is reacted with an equal molar amount of acrylonitrile to produce 3-cyanethyl-5,5-dimethylhydantoin.

3. Process according to claim 1, wherein 5,5-dimethylhydantoin is reacted with acrylonitrile in the molar proportion of 1 mole of 5,5-dimethylhydantoin to 2 moles of acrylonitrile, to produce 1,3-dicyanethyl-5,5-dimethylhydantoin.

4. Process according to claim 1, characterized in that the aqueous solution is maintained during the entire contacting time at pH values between about 7.5 and 8.5.

5. Process according to claim 4, wherein 5,5-dimethylhydantoin is reacted with an equal molar amount of acrylonitrile to produce 3-cyanethyl - 5,5 - dimethylhydantoin.

6. Process according to claim 4, wherein 5,5-dimethylhydantoin is reacted with acrylonitrile in the molar proportion of 1 mole of 5,5-dimethylhydantoin to 2 moles of acrylonitrile, to produce 1,3-dicyanethyl-5,5-dimethylhydantoin.

References Cited

FOREIGN PATENTS 13,927    9/1960    Japan _____ 260—309.5

OTHER REFERENCES

Adams et al., Organic Reaction, vol. 5, pp. 82–89, New York, Willey, 1949, QD251.07.

American Cyanamid, The Chemistry of Acrylonitrile, 2nd ed., pp. 22–4; New York, American Cyanamid, 1959, QD401.A52.

NATALIE TROUSOF, Primary Examiner